United States Patent
Horiuchi et al.

(10) Patent No.: US 10,442,720 B2
(45) Date of Patent: Oct. 15, 2019

(54) METHOD OF FORMING HOLE IN GLASS SUBSTRATE BY USING PULSED LASER, AND METHOD OF PRODUCING GLASS SUBSTRATE PROVIDED WITH HOLE

(71) Applicant: AGC Inc., Chiyoda-ku (JP)

(72) Inventors: Kohei Horiuchi, Chiyoda-ku (JP); Motoshi Ono, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 36 days.

(21) Appl. No.: 15/276,990

(22) Filed: Sep. 27, 2016

(65) Prior Publication Data

US 2017/0096361 A1  Apr. 6, 2017

(30) Foreign Application Priority Data

Oct. 1, 2015  (JP) ................................. 2015-196264

(51) Int. Cl.
| | | |
|---|---|---|
| *C03B 33/08* | (2006.01) | |
| *B23K 26/073* | (2006.01) | |
| *B23K 26/0622* | (2014.01) | |
| *B23K 26/382* | (2014.01) | |
| *B23K 26/402* | (2014.01) | |
| *B23K 103/00* | (2006.01) | |

(52) U.S. Cl.
CPC ........ *C03B 33/082* (2013.01); *B23K 26/0622* (2015.10); *B23K 26/382* (2015.10); *B23K 26/402* (2013.01); *B23K 2103/54* (2018.08)

(58) Field of Classification Search
CPC ....................... C03C 23/0025; C03C 33/02–12
See application file for complete search history.

(56) References Cited

U.S. PATENT DOCUMENTS

| | | | | |
|---|---|---|---|---|
| 6,143,382 A | * | 11/2000 | Koyama | ............... C03C 4/0071 |
| | | | | 216/11 |
| 6,262,389 B1 | * | 7/2001 | Koyama | ................... C03C 4/06 |
| | | | | 204/192.2 |

(Continued)

FOREIGN PATENT DOCUMENTS

| | | |
|---|---|---|
| JP | 2000-301372 A | 10/2000 |
| JP | 2005-88023 A | 4/2005 |

(Continued)

OTHER PUBLICATIONS

Junichi Ikeno, et al., "Crack-free and 3-Dimensional YAG Laser Processing of Glass-ceramics", Journal of the Japan Society for Precision Engineering, vol. 64, (7), 1998, 7 pgs. (with partial English translation).

*Primary Examiner* — Jodi C Franklin
(74) *Attorney, Agent, or Firm* — Oblon, McClelland, Maier & Neustadt, L.L.P.

(57) ABSTRACT

Disclosed is a method of forming a hole in a glass substrate by using a pulsed laser, the method including (1) preparing the glass substrate including a first surface and a second surface that face each other; (2) forming a concave portion on the first surface by irradiating, with a first condition, the pulsed laser onto the first surface of the glass substrate through a lens; and (3) forming the hole by irradiating the pulsed laser onto the concave portion with a second condition such that energy density of the pulsed laser is less than or equal to a processing threshold value of the glass substrate.

20 Claims, 7 Drawing Sheets

(56) References Cited

U.S. PATENT DOCUMENTS

| | | | | |
|---|---|---|---|---|
| 7,217,448 B2* | 5/2007 | Koyo | | B23K 26/073 428/131 |
| 8,785,010 B2* | 7/2014 | Eda | | C03C 19/00 428/64.2 |
| 9,227,868 B2* | 1/2016 | Matsumoto | | C03B 33/091 |
| 9,346,130 B2* | 5/2016 | Lei | | C03B 33/082 |
| 2003/0150839 A1* | 8/2003 | Kobayashi | | C03C 15/00 216/97 |
| 2004/0188393 A1* | 9/2004 | Li | | B23K 26/04 219/121.7 |
| 2005/0087522 A1* | 4/2005 | Sun | | B23K 26/0604 219/121.71 |
| 2007/0019187 A1* | 1/2007 | Schuster | | B01D 67/0034 356/237.6 |
| 2007/0262464 A1* | 11/2007 | Watkins | | H01L 21/76898 257/774 |
| 2007/0291496 A1* | 12/2007 | Nashner | | B29D 11/00663 362/375 |
| 2008/0093775 A1* | 4/2008 | Menoni | | B23K 26/032 264/400 |
| 2010/0320179 A1* | 12/2010 | Morita | | B28D 5/0011 219/121.69 |
| 2012/0168412 A1* | 7/2012 | Hooper | | B23K 26/70 219/121.69 |
| 2015/0118522 A1* | 4/2015 | Hosseini | | G11B 5/8404 428/846.9 |
| 2015/0136743 A1* | 5/2015 | Hosseini | | B23K 26/364 219/121.61 |
| 2015/0140735 A1* | 5/2015 | Hosseini | | B81C 1/00634 438/107 |
| 2016/0279895 A1* | 9/2016 | Marjanovic | | B32B 3/266 |
| 2018/0029924 A1* | 2/2018 | Inoue | | C03C 4/0071 |
| 2018/0068868 A1* | 3/2018 | Jaramillo | | H01L 21/4807 |

FOREIGN PATENT DOCUMENTS

| | | |
|---|---|---|
| JP | 2005-118821 A | 5/2005 |
| WO | WO 02/081142 A1 | 10/2002 |

* cited by examiner

| EXAMPLE | 1 | 2 | 3 | 4 | 5 | 6 |
|---|---|---|---|---|---|---|
| NUMBER OF SHOTS (TIMES) | 50 | 30 | 20 | 10 | 5 | 3 |
| CROSS-SECTIONAL SHAPE OF CONCAVE PORTION |  |  |  |  |  |  |
| SURFACE SHAPE OF CONCAVE PORTION |  |  |  |  |  |  |
| $d/\phi$ RATIO | 2.05 | 1.51 | 1.09 | 0.67 | 0.24 | 0.23 |

| EXAMPLE | 10 | 11 | 12 | 13 | 14 |
|---|---|---|---|---|---|
| NUMBER OF SHOTS (TIMES) | 50 | 30 | 20 | 10 | 5 |
| CROSS-SECTIONAL SHAPE OF CONCAVE PORTION |  |  |  |  | None |
| SURFACE SHAPE OF CONCAVE PORTION |  |  |  |  |  |
| d/φ RATIO | 2.37 | 1.13 | 0.65 | 0.35 | 0.19 |

METHOD OF FORMING HOLE IN GLASS SUBSTRATE BY USING PULSED LASER, AND METHOD OF PRODUCING GLASS SUBSTRATE PROVIDED WITH HOLE

CROSS-REFERENCE TO RELATED APPLICATION

The present application is based on and claims the benefit of priority of Japanese Patent Application No. 2015-196264, filed on Oct. 1, 2015, the entire contents of which are hereby incorporated herein by reference.

BACKGROUND OF THE INVENTION

1. Field of the Invention

The present invention relates to a method of forming a hole in a glass substrate by using a pulsed laser, and a method of producing a glass substrate provided with a hole.

2. Description of the Related Art

A technique has been know, so far, that is for forming one or more through holes in a glass substrate by irradiating a laser beam, such as a $CO_2$ laser, onto a glass substrate. Recently, in order to form a more finer through hole, it has been studied to perform through hole processing by using a pulsed laser, as the laser.

For example, it is described in Non-Patent Document 1 (Journal of the Japan Society for Precision Engineering, Vol. 64, No. 7, 1998, pages 1062-1066) that, during processing, a pigment that favorably absorbs a laser beam is applied to a surface of a glass substrate, so that energy density of a pulsed laser is decreased.

For a case where a pulsed laser is used, for example, a fine hole with a diameter that is approximately less than or equal to 30 μm can be formed in a glass substrate.

However, since peak power of a pulsed laser is greater than peak power of a laser, such as a continuous wave (CW) laser, a crack and/or a defect tends to occur in the glass substrate during a hole forming process and/or after forming a hole. In addition, when energy density of a pulsed laser is lowered so as to avoid occurrence of such a crack and/or a defect, processing time for forming a hole in the glass substrate becomes longer, or a hole may not be formed.

Note that, by the experiment by the inventors, it has been found that a crack and/or a defect may occur, even if the method described in Non-Patent Document 1 is used.

There is a need for a method with which a hole can be formed in a practical time by using a pulsed laser, without significantly generating cracks and/or defects in a glass substrate.

SUMMARY OF THE INVENTION

According to an aspect of the present invention, there is provided a method of forming a hole in a glass substrate by using a pulsed laser, the method including (1) a process of preparing the glass substrate including a first surface and a second surface that face each other;

(2) a process of forming a concave portion on the first surface by irradiating, with a first condition, the pulsed laser onto the first surface of the glass substrate through a lens, wherein the concave portion on the first surface has a diameter φ and a depth d, wherein the diameter φ is greater than or equal to a diameter S (φ≥S) of a spot on the first surface formed by the pulsed laser, the diameter S being expressed by a formula (i), $$\text{the spot diameter } S=(4\times\lambda\times f\times M^2)/(\pi\times r) \tag{i}$$

where λ is a wavelength of the pulsed laser, f is a focal length of the lens, $M^2$ is an M-squared value, and r is a diameter of a beam of the pulsed laser entering the lens, and wherein the depth d is greater than or equal to 0.7 times the diameter φ, and (3) a process of forming the hole by irradiating the pulsed laser onto the concave portion with a second condition such that energy density of the pulsed laser is less than or equal to a processing threshold value of the glass substrate.

According to another aspect of the present invention, there is provided a method of producing a glass substrate with a hole, the method including (1) a process of preparing the glass substrate including a first surface and a second surface that face each other;

(2) a process of forming a concave portion on the first surface by irradiating, with a first condition, a pulsed laser onto the first surface of the glass substrate through a lens, wherein the concave portion on the first surface has a diameter φ and a depth d, wherein the diameter φ is greater than or equal to a diameter S (φ≥S) of a spot on the first surface formed by the pulsed laser, the diameter S being expressed by a formula (i), $$\text{the spot diameter } S=(4\times\lambda\times f\times M^2)/(\pi\times r) \tag{i}$$

where λ is a wavelength of the pulsed laser, f is a focal length of the lens, $M^2$ is an M-squared value, and r is a diameter of a beam of the pulsed laser entering the lens, and wherein the depth d is greater than or equal to 0.7 times the diameter φ, and (3) a process of forming the hole by irradiating the pulsed laser onto the concave portion with a second condition such that energy density of the pulsed laser is less than or equal to a processing threshold value of the glass substrate.

According to an embodiment of the present invention, a method can be provided with which a hole can be formed in a practical time by using a pulsed laser, without generating a crack and/or a defect in a glass substrate.

DETAILED DESCRIPTION OF THE PREFERRED EMBODIMENTS

According to an embodiment of the present invention, there is provided a method of forming a hole in a glass substrate by using a pulsed laser, the method including (1) a process of preparing a glass substrate including a first surface and a second surface that face each other;

(2) a process of forming a concave portion on the first surface by irradiating, with a first condition, the pulsed laser onto the first surface of the glass substrate through a lens, wherein the concave portion on the first surface has a diameter φ and a depth d, wherein the diameter φ is greater than or equal to a diameter S (φ≥S) of a spot on the first surface formed by the pulsed laser, the diameter S being expressed by a formula (i), $$\text{the spot diameter } S=(4\times\lambda\times f\times M^2)/(\pi\times r) \quad (i),$$

where λ is a wavelength of the pulsed laser, f is a focal length of the lens, $M^2$ is an M-squared value, and r is a diameter of a beam of the pulsed laser entering the lens, and wherein the depth d is greater than or equal to 0.7 times the diameter φ, and (3) a process of forming the hole by irradiating the pulsed laser onto the concave portion with a second condition such that energy density of the pulsed laser is less than or equal to a processing threshold value of the glass substrate.

In the embodiment of the present invention, during forming the hole in the glass substrate by using the pulsed laser, the two-step process that includes the process (2) and the process (3) is performed. Here, the process (2) and the process (3) are also referred to as "first irradiation step" and "second irradiation step," respectively.

The irradiation steps are described below.

First, at the first irradiation step, a concave portion is formed on a first surface of a glass substrate by irradiating, with a first irradiation condition, a pulsed laser onto the glass substrate through a lens.

Figure 1:
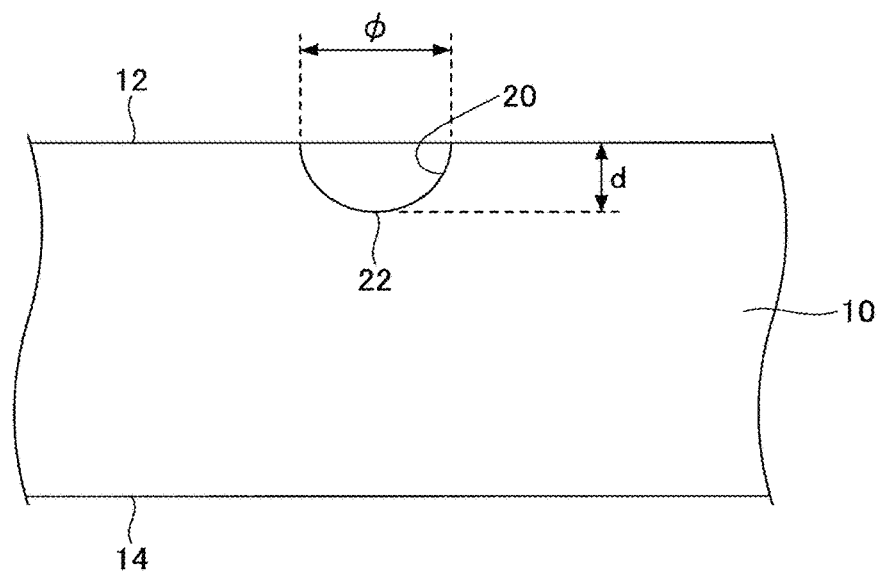
FIG. 1 is a diagram schematically illustrating a cross-section of a glass substrate in a process of a through hole forming method according to an embodiment of the present invention.

FIG. 1 schematically illustrates a cross-section of the glass substrate, after completing the first irradiation step.

As illustrated in FIG. 1, the glass substrate 10 includes a first surface 12 and a second surface 14. In addition, a concave portion 20 is formed on the first surface 12 of the glass substrate 10. On the first surface 12, the concave portion 20 has a diameter φ, and a depth d.

Here, the diameter φ of the concave portion 20 has a size that is greater than or equal to that of a diameter S of a spot that is expressed by a formula (1), $$\text{the spot diameter } S=(4\times\lambda\times f\times M^2)/(\pi\times r) \quad (i),$$

where λ is a wavelength of the pulsed laser, f is a focal length of the lens, $M^2$ is an M-squared value, and r is a diameter of a beam of the pulsed laser entering the lens (condition A). Additionally, the depth d of the concave portion 20 is greater than or equal to 0.7 times the diameter φ (condition B). In other words, the first condition of the first irradiation step is selected, so that the concave portion 20 having the diameter φ and the depth d satisfying the above-described conditions A and B is formed on the first surface 12 of the glass substrate 10.

Note that, though the concave portion 20 is formed in the glass substrate 10 at the first irradiation step, a hole having a desired depth is not yet formed.

Subsequently, in the second irradiation step, the energy density of the pulsed laser is controlled to be less than or equal to a processing threshold value of the glass substrate 10. Further, the pulsed laser with such "low energy density" is irradiated toward the concave portion 20.

Here, in a normal case, the surface of the glass substrate 10 is hardly processed, if the pulsed laser with the energy density that is controlled to be less than or equal to the processing threshold value of the glass substrate 10 is irradiated onto the glass substrate 10.

However, in the embodiment of the present invention, during the second irradiation step, the pulsed laser is irradiated onto the concave portion 20 having the above-described shape. In this case, due to the reflection on an inner wall of the concave portion 20, the pulsed laser is intensively irradiated onto a tip 22 (cf. FIG. 1) of the concave portion 20. Consequently, processing proceeds even with the irradiation of the pulsed laser with the energy density that is less than or equal to the processing threshold value, so that the tip 22 of the concave portion 20 can be extended toward the width direction of the glass substrate 10. Further, when the tip 22 of the concave portion 20 continues extending, and when the tip 22 of the concave portion 20 reaches the second surface 14 of the glass substrate 10, a through hole can be formed in the glass substrate 10.

Note that the above-described mechanism is observed by the inventors at the present time, and the actual process of forming the hole may be described by another mechanism.

In this manner, in the embodiment of the present invention, a hole is formed in a glass substrate through the first irradiation step and the second irradiation step. In this method, unlike a method of forming a hole by continuing irradiation of a pulsed laser with energy density that exceeds the processing threshold value onto a glass substrate, a pulsed laser with energy density that is less than or equal to the processing threshold value can be used in the second irradiation process. Consequently, a likelihood can be significantly reduced that a crack and/or a defect occurs in the glass substrate, during forming the hole and/or after forming the hole.

Additionally, in this method, processing of the glass substrate is continued at the second irradiation step by using the concave portion 20 that is obtained at the first irradiation process. Consequently, a situation can be avoided that a hole with a desired depth is not formed within a practical time, which situation occurs in the method of simply continuing irradiation of the pulsed laser with the reduced energy density.

In this manner, in the embodiment of the present invention, a hole can be formed within a practical time by suppressing, as much as possible, occurrence of a crack and/or a defect in the glass substrate.

(The Concave Portion 20)

As described above, the concave portion 20 that is formed at the first irradiation step has the diameter φ and the depth d.

The diameter φ of the concave portion 20 is, for example, in a range from 3 μm to 30 μm, and preferably in a range from 11 μm to 21 μm. Further, the depth d of the concave portion 20 is, for example, in a range from 2.1 μm to 120 μm, and preferably in a range from 13 μm to 42 μm.

Furthermore, a ratio d/φ between the depth d and the diameter φ is preferably greater than or equal to 0.7; more preferably greater than or equal to 1.0, particularly preferably greater than or equal to 1.5, and most preferably greater than or equal to 2.0. The ratio d/φ is preferably less than or equal to 4.0; more preferably less than or equal to 3.5; and particularly preferably less than or equal to 3.0. The reason is that, when the concave portion 20 is formed in such a manner that the ratio d/φ exceeds 4, a crack and/or a defect tends to be generated.

(The Pulsed Laser Used in the Embodiment of the Present Invention)

In the embodiment of the present invention, the wavelength λ of the pulsed laser to be used may be in a range from 200 nm to 1200 nm. The wavelength λ of the pulsed laser may be 355 nm, for example.

Furthermore, in the embodiment of the present invention, the diameter S of the spot that is expressed by the above-described formula (1) may be in a range from 2 µm to 25 µm; may be in a range from 5 µm to 22 µm; and may be in a range from 10 µm to 20 µm.

Figure 2:
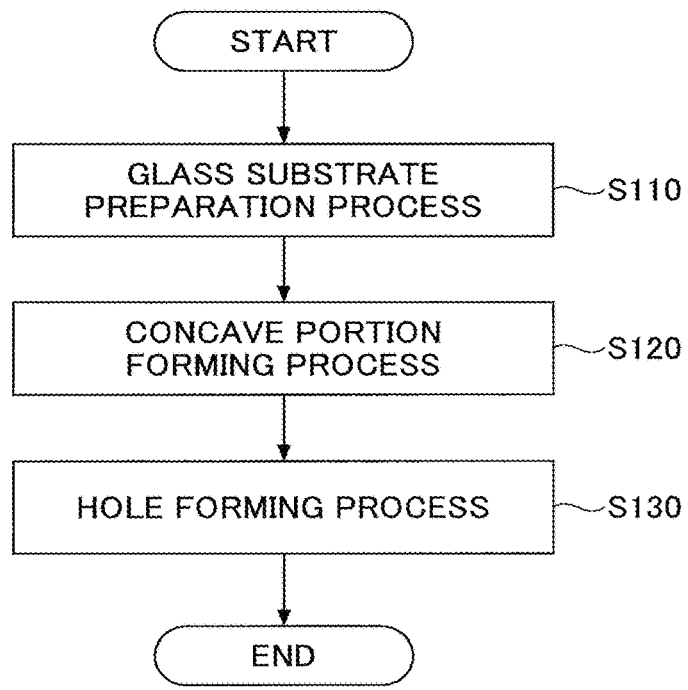
FIG. 2 is a diagram schematically illustrating a flow of a method of forming a hole in a glass substrate according to the embodiment of the present invention.
Figure 3:
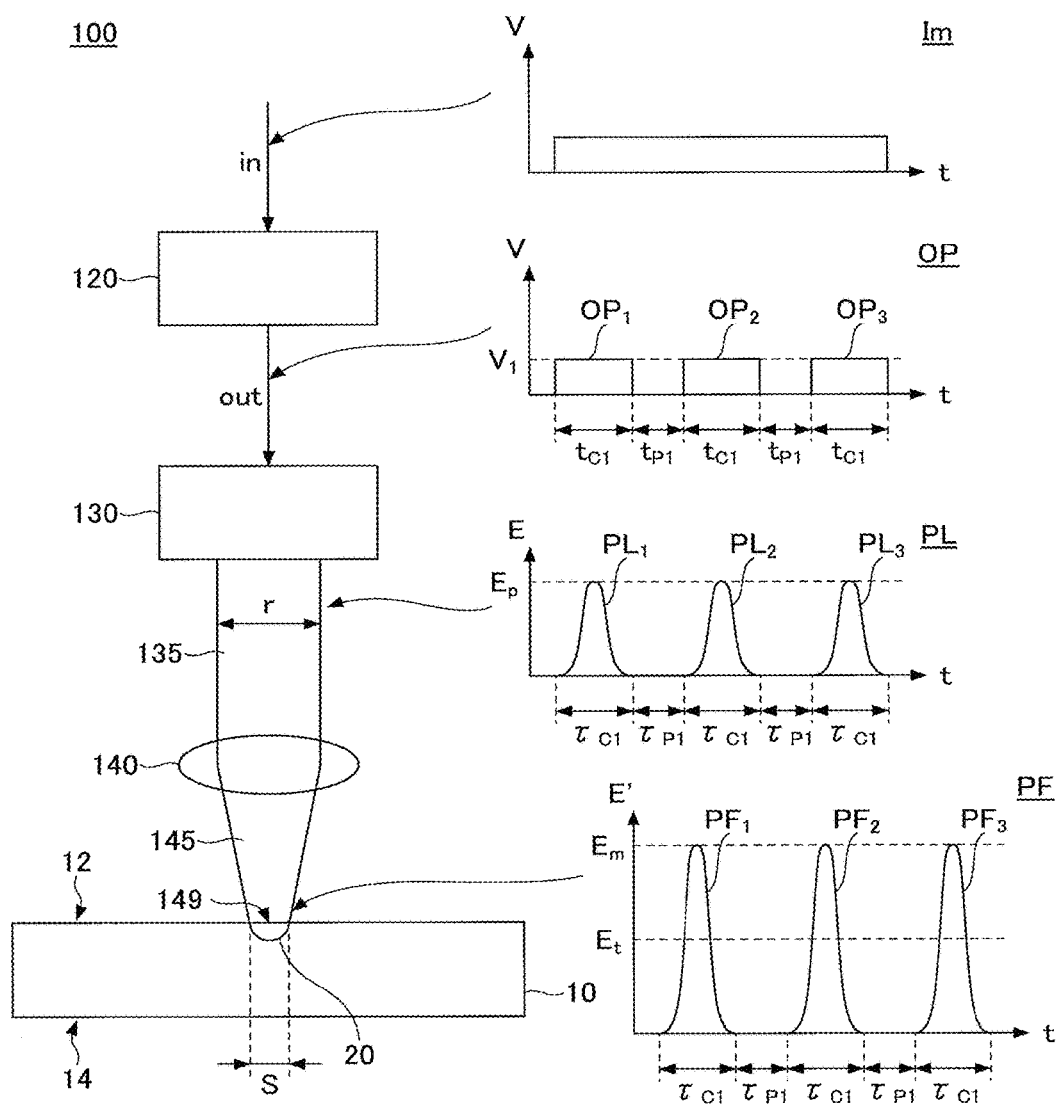
FIG. 3 is a diagram schematically illustrating a configuration of equipment that can be used in the through hole forming method according to the embodiment of the present invention.
Figure 4:
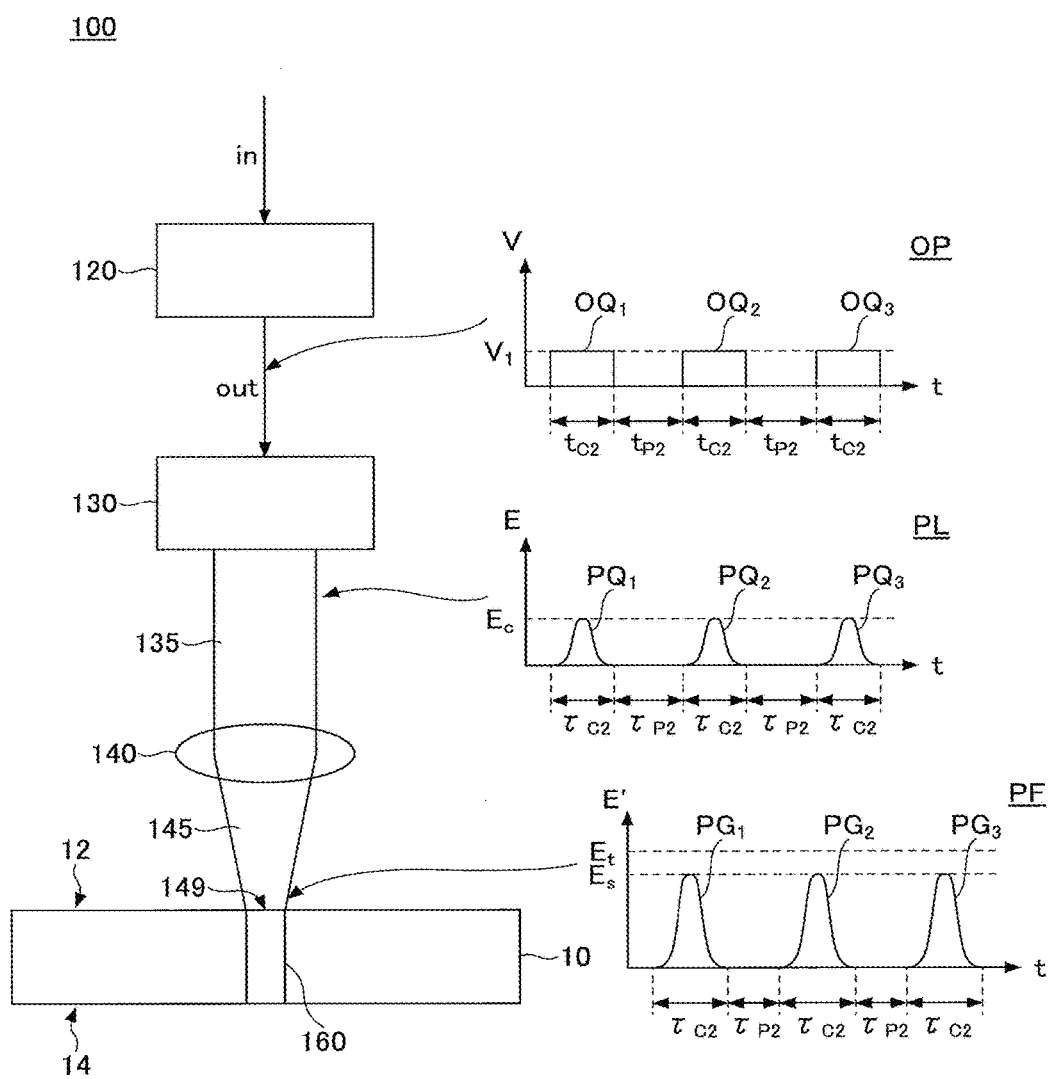
FIG. 4 is a diagram schematically illustrating the configuration of the equipment that can be used in the through hole forming method according to the embodiment of the present invention.

Next, the method of forming the hole in the glass substrate according to the embodiment of the present invention is described in more detail by referring to FIGS. 2-4.

FIG. 2 schematically illustrates a flow of the method of forming the hole in the glass substrate (which is referred to as the "first hole forming method," hereinafter) according to the embodiment of the present invention.

As illustrated in FIG. 2, the first hole forming method includes (1) a process of preparing a glass substrate including a first surface and a second surface that face each other (a glass substrate preparation process) (step S110);

(2) a process of forming a concave portion on the first surface by irradiating, with a first condition, a pulsed laser onto the first surface of the glass substrate through a lens, where the first condition is such that energy density of the pulsed laser is selected to exceed a processing threshold value of the glass substrate (a concave portion forming process) (step S120); and (3) a process of forming a hole by irradiating the pulsed laser onto the concave portion with a second condition such that the energy density of the pulsed laser is less than or equal to the processing threshold value of the glass substrate (a hole forming process) (step S130).

Each process is described below by referring to FIG. 3 and FIG. 4. Note that FIG. 3 and FIG. 4 schematically illustrate a configuration of equipment that can be used for implementing the first hole forming method.

(Step S110)

First, a glass substrate is prepared, which is to be processed.

The composition of the glass substrate is not particularly limited.

The thickness of the glass substrate is not particularly limited; however, the thickness of the glass substrate may be in a range from 0.05 mm to 0.7 mm.

(Step S120)

Subsequently, a pulsed laser is irradiated onto the first surface of the glass substrate with the first condition. As a result, a concave portion is formed on the first surface of the glass substrate. Note that step S120 corresponds to the above-described first irradiation step. Accordingly, in the following description, step S120 is also referred to as the first irradiation step.

FIG. 3 schematically illustrates a configuration of the equipment that can be used for step S120, i.e., for the first irradiation step.

As illustrated in FIG. 3, the equipment 100 includes a function generator 120; a laser oscillator 130; and a lens 140.

The function generator 120 has a function to output a predetermined rectangular wave signal OP, in response to an input gate signal Im.

The laser oscillator 130 has a function to emit a pulsed laser beam PL, based on the rectangular wave signal OP output from the function generator 120.

The pulsed laser beam PL (which is also referred to as the pulsed laser beam 135) emitted from the laser oscillator 130 is irradiated onto the lens 140. The lens 140 has a function to condense a pulsed laser beam 145 onto the first surface 12 of the glass substrate 10, which is to be processed.

For forming the concave portion 20 in the glass substrate 10 by using the equipment 100, first, the glass substrate 10 is set in the equipment 100. The glass substrate 10 is located at a side opposite to the laser oscillator 130 with respect to the lens 140. The glass substrate 10 may be placed, for example, on a holder (not depicted) including an XY stage. The glass substrate 10 is arranged, so that the pulsed laser is irradiated onto the first surface 12.

Subsequently, as the above-described first irradiation step, the gate signal Im is input to the function generator 120. In response to the input gate signal Im, the function generator 120 outputs a predetermined rectangular wave signal OP.

In the example of FIG. 3, the gate signal Im is input to the function generator 120; and the function generator 120 outputs rectangular waves $OP_1$, through $OP_3$, each having a voltage $V_1$, for example. Each of the rectangular waves $OP_1$ through $OP_3$ has duration $t_{c1}$; and an interval between adjacent rectangular waves is $t_{p1}$. However, for a rectangular wave signal OP, a number of rectangular waves, a voltage $V_1$ of each rectangular wave, duration $t_c$, and an interval $t_p$ between adjacent rectangular waves can be adjusted to be predetermined values.

Subsequently, the rectangular wave signal OP output from the function generator 120 is input to the laser oscillator 130. The laser oscillator 130 emits a pulsed laser beam PL based on the input rectangular wave signal OP.

For example, in the example of FIG. 3, the laser oscillator 130 emits a pulsed laser beam PL including three pulse waves $PL_1$ through $PL_3$ based on the input rectangular wave signal OP. Each of the pulse waves $PL_1$ through $PL_3$ has pulse energy $E_p$ and duration $\tau_{c1}$; and an interval between adjacent pulse waves is $\tau_{p1}$. Here, a unit of the pulse energy Ep, i.e., a unit of measure of the vertical axis E is "J."

Here, for the pulsed laser beam PL, a number of pulse waves, pulse energy $E_p$ of each pulse wave, duration $\tau_c$, and an interval $\tau_p$ between adjacent pulse waves can be adjusted to be predetermined values.

Subsequently, the pulsed laser beam PL (which is also referred to as the pulsed laser beam 135) emitted from the laser oscillator 130 is irradiated onto the lens 140. The pulsed laser beam 135 irradiated onto the lens 140 is condensed by the lens 140 to form a pulsed laser beam PF (which is also referred to as the pulsed laser beam 145); and the pulsed laser beam PF is irradiated onto the glass substrate 10. Consequently, a spot 149 is formed on the first surface 12 of the glass substrate 10.

A spot diameter S of the spot 149 is expressed as follows:

$$\text{the spot diameter } S=(4\times\lambda\times f\times M^2)/(\pi\times r) \qquad (1),$$

Here, λ is a wavelength of the pulsed laser beam 135, f is a focal length of the lens 140, $M^2$ is an M-squared value, and r is a diameter of the pulsed laser beam 135 that enters the lens 140 (cf. FIG. 3).

The energy density $E_m$ of the laser is calculated by dividing the pulse energy $E_p$ of the pulsed laser beam output from the laser oscillator 130 by the area represented by the spot diameter S. Namely, the energy density Em of the laser is expressed as follows:

the energy density $E_m = E_p/(\pi \times (S/2)^2)$

Here, the unit of the energy density $E_m$, i.e., the unit of measure of the vertical axis E' that represents the waveform of the pulsed laser beam PF in FIG. 3 is J/mm².

The energy density $E_m$ is selected to exceed the processing threshold value $E_t$ of the glass substrate 10. For example, suppose that each of the pulse waves $PL_1$ through $PL_3$ included in the pulsed laser beam PL has pulse energy $E_p$ that is greater than or equal to 100 μJ. In this case, by setting the focal length to be 50 mm and the diameter r of the pulsed laser beam to be 2.5 mm, the energy density $E_m$ exceeds the processing threshold value $E_t$ of the glass substrate 10.

By irradiation of the pulsed laser beam 145, the concave portion 20 is formed on the first surface 12 of the glass substrate 10.

As described above, an irradiation condition of the pulsed laser beam 145 is selected such that (A) the diameter φ of the concave portion 20 is greater than or equal to the spot diameter S represented by the formula (1); and (B) the depth d of the concave portion 20 is greater than or equal to 0.7 times the diameter φ.

A number of times of irradiating the pulsed laser beam 145 (which is referred to as the "number of shots," hereinafter) in the first irradiation step is preferably from 1 time to 300 times; preferably from 5 times to 100 times; and more preferably from 11 times to 50 times.

(Step S130)

Subsequently, the pulsed laser beam is irradiated onto the concave portion 20 of the glass substrate 10 with a second condition. By doing this, a hole with a desired depth is formed in the first surface 12 of the glass substrate 10. Here, step S130 corresponds to the above-described second irradiation step. Accordingly, in the following description, step S130 is also referred to as the second irradiation step.

FIG. 4 schematically illustrates step S130, namely, the situation of the second irradiation step. As illustrated in FIG. 4, in the second irradiation step, the rectangular wave signal OP to be output from the function generator 120 is changed from that of the first irradiation step. Consequently, the waveform of the pulsed laser beam PL (the pulsed leaser beam 135) emitted from the laser oscillator 130 is changed from that of the first irradiation step.

The method of switching the waveform of the pulsed laser beam PL from the first irradiation step to the second irradiation step is not particularly limited. For example, the waveform of the pulsed laser beam PL may be switched by a PWM control method, an output modulation method, or a frequency modulation method.

As an example, a method of switching the waveform of the pulsed laser beam PL by the PWM control method is described below.

In this case, as illustrate in FIG. 4, the rectangular wave signal OP output from the function generator 120 is changed, so that the rectangular wave signal OP includes the rectangular waves $OQ_1$ through $OQ_3$, each having the voltage $V_1$. Each of the rectangular waves $OQ_1$ through $OQ_3$ has duration $t_{c2}$; and an interval between adjacent rectangular waves is $t_{p2}$.

Here, when the rectangular wave signal OP at the first irradiation step illustrated in FIG. 3 and the rectangular wave signal OP at the second irradiation step illustrated in FIG. 4 are compared, the following inequalities may be satisfied: for the duration $t_{c2} < t_{c1}$; and for the interval between adjacent rectangular waves $t_{p2} > t_{p1}$.

Subsequently, the rectangular wave signal OP output from the function generator 120 is input to the laser oscillator 130. By doing this, a pulsed laser beam PL whose output is modulated is emitted from the laser oscillator 130.

More specifically, as illustrated in FIG. 4, the pulsed laser beam PL includes three pulsed waves $PQ_1$ through $PQ_3$. Each of the pulsed waves $PQ_1$ through $PQ_3$ has the pulse energy $E_c$ and the duration $\tau_{c2}$; and an interval between adjacent pulse waves is $\tau_{p2}$.

Here, the pulse energy $E_c$ is selected, so that the energy density $E_s$ of each of the pulse waves $PG_1$ through $PG_3$ of the pulsed laser beam PF, which is condensed by the lens 140, is less than or equal to the processing threshold value $E_t$ of the glass substrate 10. The energy density $E_s$ may be, for example, in a range from (1/10) times the processing threshold value $E_t$ to (1/2) times the processing threshold value $E_t$.

In this manner, the pulsed laser beam PL, i.e., the pulsed laser beam 135 is condensed by the lens 140 to form the pulsed laser beam 145; and the pulsed laser beam 145 is irradiated onto the concave portion 20 of the glass substrate 10.

As described above, in the second irradiation step, processing of the glass substrate 10 can be proceeded with, even if the energy density $E_s$ of each of the pulse waves $PG_1$ through $PG_3$ is less than or equal to the processing threshold value $E_t$ of the glass substrate 10. Thus, after irradiating the pulsed laser beam 145 a number of times corresponding to a certain number of shots, the hole 160 having the desired depth is formed in the glass substrate 10. FIG. 4 illustrates an example in which the through hole 160 is formed.

The number of shots of the pulsed laser beam 145 in the second irradiation step may be adjusted to be a number of times with which the tip 22 of the concave portion 20 reaches a predetermined depth. A preferred number of shots differs depending on the desired depth of the hole and the thickness of the glass substrate 10. For example, the number of shots is preferably from 1 time to 3000 times, and more preferably from 1 time to 1500 times.

By the above-described processes, a hole with a desired depth can be formed in the glass substrate 10.

In the first hole forming method, a hole can be formed within a practical time, and an occurrence of a crack and/or a defect can be significantly suppressed.

Additionally, after forming the hole, an annealing process can be applied to the glass substrate 10; and after that, by applying an etching process, a diameter of the hole can be enlarged, an inner part of the hole can be smoothed, and debris on the surface of the glass substrate 10 can be removed.

Figure 5:
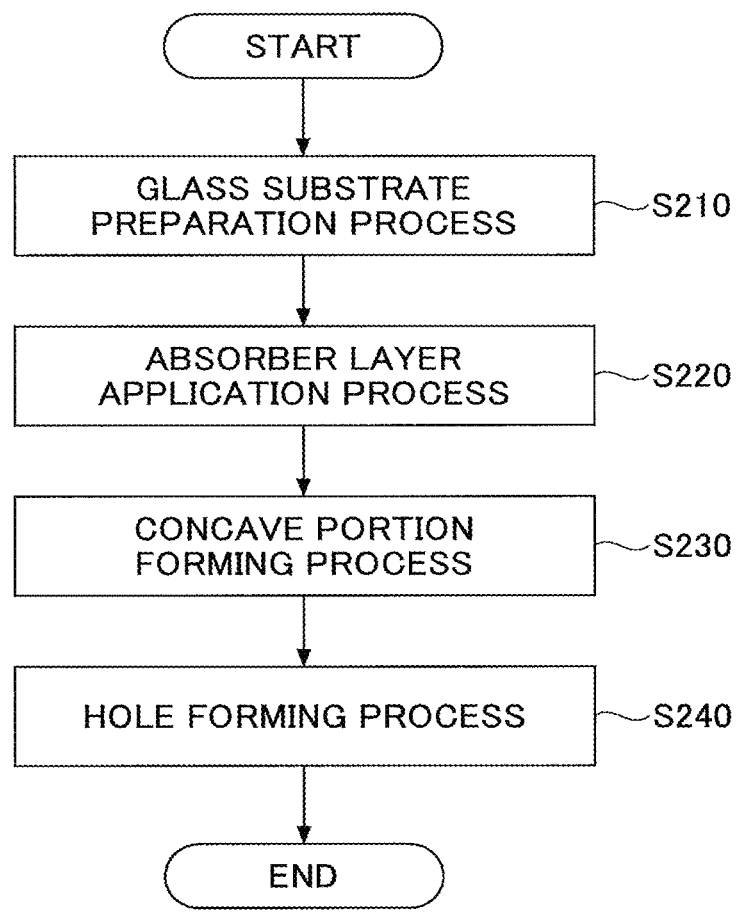
FIG. 5 is a diagram schematically illustrating a flow of another hole forming method according to the embodiment of the present invention.
Figure 6:
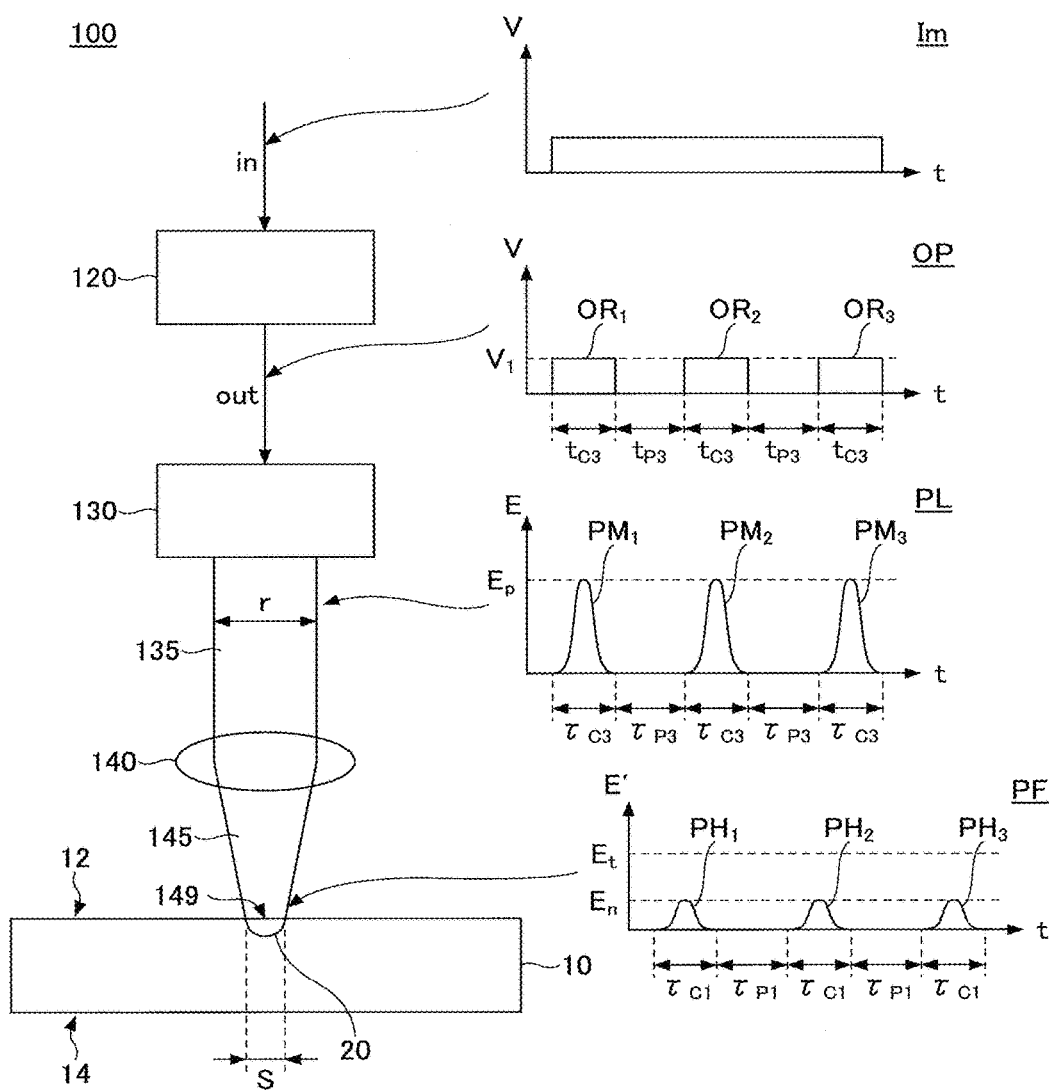
FIG. 6 is a diagram schematically illustrating a configuration of equipment that can be used in the other hole forming method according to the embodiment of the present invention.

Next, another method of forming a hole in a glass substrate according to an embodiment of the present invention is described in more detail by referring to FIG. 5 and FIG. 6.

FIG. 5 schematically illustrates a flow of the other method of forming the hole in the glass substrate (which is referred to as the second hole forming method, hereinafter) according to the embodiment of the present invention.

As illustrated in FIG. 5, the second hole forming method includes (1) a process of preparing a glass substrate including a first surface and a second surface that face each other (a glass substrate preparation process) (step S210);

(2) a process of applying an absorber layer on the first surface of the glass substrate (an absorber layer application process) (step S220);

(3) a process of forming a concave portion on the first surface by irradiating, with a first condition, a pulsed laser onto the first surface of the glass substrate through a lens, where the first condition is selected, so that the energy density of the pulsed laser is less than or equal to the processing threshold value of the glass substrate (a concave portion forming process) (step S230); and (4) a process of forming a hole by irradiating, with a second condition, the pulsed laser onto the concave portion, where the second condition is such that the energy density of the pulsed laser is less than or equal to the processing threshold value of the glass substrate (a hole forming process) (step S240).

These processes are described below.

(Step S210)

First, a glass substrate is prepared, which is to be processed. Since the process is the same as the step S110 of the above-described first hole forming method, the process is not described further here.

(Step S220)

Subsequently, an absorber layer applies on the first surface of the glass substrate.

The material of the absorber layer is not particularly limited, as long as the material has a function to absorb at least a part of the energy of the pulsed laser to be used at step S230. The absorber layer may be a pigment including synthetic resin ink and/or carbon black, for example.

The absorber layer applies on the first surface of the glass substrate, for example, by a spray coating method or an inkjet method.

(Step S230)

Subsequently, the pulsed laser is irradiated onto the first surface of the glass substrate with the first condition. As a result, a concave portion is formed on the first surface of the glass substrate. Note that step S230 corresponds to the above-described first irradiation step. Accordingly, in the following description, step S230 is also referred to as the first irradiation step.

FIG. 6 schematically illustrates step S230, i.e., a situation in the first irradiation step. Note that, in FIG. 6, the absorber layer is not depicted for clarity.

As illustrated in FIG. 6, this first irradiation step is almost the same as the first irradiation step in the first hole forming method, such as that of illustrated in FIG. 3.

For example, in the example of FIG. 6, the gate signal Im is input to the function generator 120; and the function generator 120 outputs rectangular waves $OR_1$ through $OR_3$, each having the voltage $V_1$. Each of the rectangular waves $OR_1$ through $OR_3$ has duration $t_{c3}$; and an interval between adjacent rectangular waves is $t_{p3}$. Further, in the example of FIG. 6, the laser oscillator 130 emits a pulsed laser beam PL including three pulse waves $PM_1$ through $PM_3$ base on the input rectangular wave signal OP. Each of the pulse waves $PM_1$ through $PM_3$ has pulse energy $E_1$ and duration $\tau_{c3}$; and an interval between adjacent pulses is $\tau_{p3}$. Here, unit of the pulse energy $E_1$, namely, the unit of measure of the vertical axis E is J.

However, in step S230, the energy density $E_n$ of each of pulse waves $PH_1$ through $PH_3$ included in the pulsed laser beam 145 to be irradiated onto the glass substrate 10 is selected, so that the energy density $E_n$ is less than or equal to the processing threshold value $E_t$ of the glass substrate 10.

The reason for setting the energy density $E_n$ to be less than or equal to the processing threshold value $E_t$ is that, in the second hole forming method, by the existence of the absorber layer, the concave portion 20 having the above described features can be formed, even if the energy density $E_n$ of the pulsed laser beam 145 is less than or equal to the processing threshold value $E_t$ of the glass substrate 10.

Namely, in the second hole forming method, the absorber layer (not depicted in FIG. 6) applies on the first surface 12 of the glass substrate 10 at step S220. When such an absorber layer exists on the first surface 12 of the glass substrate 10, the first surface 12 of the glass substrate 10 can be relatively easily ablated by absorption of the pulsed laser beam 145 by the absorber layer, even if the energy density on the first surface 12 of the glass substrate 10 is low. Then, the concave portion 20 having the above-described features, i.e., the concave portion 20 satisfying the conditions (A) and (B) is formed.

The number of shots of the pulsed laser beam in the first irradiation step of the second hole forming method is preferably from 1 time to 300 times; and more preferably from 21 times to 50 times, for example.

(Step S240)

Subsequently, the pulsed laser is irradiated, with the second condition, onto the concave portion 20 of the glass substrate 10. As a result, the hole with the desired depth is formed in the glass substrate 10. Here, step S240 corresponds to the above-described second irradiation step. Accordingly, in the following description, step S240 is also referred to as the second irradiation step.

Step S240 is almost the same as step S130 of the above-described first hole forming method. Namely, in step S240, the laser oscillator 130 irradiates a pulsed laser beam PL including pulse waves $PN_1$ through $PN_3$ onto the lens 140. Further, pulse waves $PK_1$ through $PK_3$ condensed by the lens 140 are irradiated onto the concave portion 20 of the glass substrate 10.

Each of the pulse waves $PN_1$ through $PN_3$ included in the pulsed laser beam PL has energy $E_g$. In other words, each of the pulse waves $PK_1$ through $PK_3$ included in the pulsed laser beam PF has energy density $E_k$. The energy density $E_k$ is selected, so that the energy density $E_k$ is less than or equal to the processing threshold value $E_t$ of the glass substrate 10 (which means the processing threshold value for a case where there is no absorber layer, and the same for the following). The energy density $E_k$ may be in a range from (1/10) times the processing threshold value $E_t$ of the glass substrate to (1/2) times the processing threshold value $E_t$ of the glass substrate, for example.

As described above, in the second irradiation step, due to the existence of the concave portion 20, processing of the hole of the glass substrate 10 can be proceeded with, even if the energy density $E_k$ of each of the pulse waves $PK_1$ through $PK_3$ is less than or equal to the processing threshold value $E_t$ of the glass substrate 10.

Note that, in the second hole forming method, the magnitude relationship between step S240, i.e., the energy density $E_k$ of the pulse wave $PK_1$ through $PK_3$ in the second irradiation step and step S230, i.e., the energy density $E_n$ of the pulse waves $PH_1$ through $PH_3$ in the first irradiation step is not particularly limited.

Namely, the energy density $E_n$ and the energy density $E_k$ may be as follows: $E_n > E_k$, $E_n = E_k$, or $E_n < E_k$.

It is apparent that, with the second hole forming method, the effect that is the same as that of the first hole forming method can be obtained, namely, the effect can be obtained such that the hole can be formed within a practical time, and an occurrence of cracks and/or defects can be significantly suppressed.

Additionally, after forming the hole, an annealing process can be applied to the glass substrate 10; and after that, by applying an etching process, a diameter of the hole can be enlarged, an inner part of the hole can be smoothed, and debris on the surface of the glass substrate 10 can be removed.

The specific examples of the method of forming the hole according to the embodiment of the present invention are described above by the first hole forming method and the second hole forming method, as the examples. However, the method of forming the hole according to the present invention is not limited to these.

For example, in the above description, at the time of transition from the first irradiation step to the second irradiation step, the waveform of the pulsed laser beam PL is changed by the PWM control method. However, instead of the PWM control method, a frequency modulation method may be used. Specifically, by changing the interval between the pulses $t_{p1}$ in FIG. 3 and the interval between the pulses $t_{p2}$ in FIG. 4, namely, by changing the time intervals, the waveforms of the pulsed laser beam PL can be changed. As a consequence, the intervals $\tau_{p1}$ and $\tau_{p2}$ between the pulses output from the laser oscillator 130 are similarly changed, and a pulse train with different time intervals can be emitted, namely, processing by the frequency modulation can be achieved.

In addition, various modifications can be made.

In the above-description, the methods according to the embodiment of the present invention are described, which are for forming the hole in the glass substrate by using the pulsed laser. However, it is apparent that these methods can be applied to a method of producing a glass substrate provided with a hole according to another embodiment of the present invention.

EXAMPLES

Next, examples of the present invention are described.

Example 1

By the following method, a through hole was formed in a glass substrate by using a pulsed laser.

First, a glass substrate (alkali-free glass) with thickness of 0.2 mm was prepared.

Subsequently, the glass substrate was set in the equipment 100, such as that of illustrated in above-described FIG. 3. In the equipment 100, the equipment WW1281A (produced by TOYO Corporation) was used as the function generator 120, and the equipment AVIA-X (produced by Coherent, Inc.) was used as the laser oscillator 130. As the lens 140 (the optical system) a plano-convex lens formed of synthetic quartz was used, which had a focal length of 50 mm.

Next, the first step and the second step of the above-described first hole forming method were implemented. The wavelength λ of the pulsed laser emitted from the laser oscillator 130 was 355 nm, and a pulse width was 20 ns. The repetition frequency was 10 kHz. Further, the diameter r of the pulsed laser beam at the time of entering the lens 140 was 2.5 mm.

Accordingly, the spot diameter S that is expressed by the above-described formula (1) is 10.8 µm, where $M^2=1.2$.

In the first irradiation step, 50 shots of the pulsed laser with energy density $E_p$ of 1.31 µJ/mm² were irradiated onto the glass substrate. Note that, in this example, the processing threshold value energy density $E_t$ of the glass substrate was 1.09 J/mm². Thus, $E_m > E_t$ was satisfied.

As a result, the concave portion was formed in the glass substrate.

In the concave portion, the diameter φ was approximately 20.4 µm, and the depth d was approximately 41.9 µm. Therefore, the ratio d/φ was approximately 2.05.

Subsequently, for the second irradiation step, the energy density of the pulsed laser beam emitted from the laser oscillator 130 was varied by the PWM control method.

In the second irradiation step, 460 shots of the pulsed laser with energy density $E_s$ of 0.22 J/mm² were irradiated onto the concave portion of the glass substrate that was formed in the first irradiation step. Here, $E_s < E_t$ was satisfied.

After completing the second irradiation step, the glass substrate was observed. As a result, it was confirmed that a through hole was formed in the glass substrate. No abnormality, such as a crack or a defect, was found in the glass substrate.

Example 2

By the method that was the same as that of example 1, a through hole was formed in a glass substrate by using the pulsed laser.

However, in example 2, the number of shots of the pulsed laser in the first irradiation step was 30 times. Other conditions were the same as those of example 1.

In the concave portion that was formed in the first irradiation step, the diameter φ was approximately 18.1 µm, and the depth d was approximately 27.5 µm. Therefore, the ratio d/φ was approximately 1.51.

After completing the second irradiation step, the glass substrate was observed. As a result, it was confirmed that a through hole was formed in the glass substrate. No abnormality, such as a crack or a defect, was found in the glass substrate.

Example 3

By the method that was the same as that of example 1, a through hole was formed in a glass substrate by using the pulsed laser.

However, in example 3, the number of shots of the pulsed laser in the first irradiation step was 20 times. Other conditions were the same as those of example 1.

In the concave portion that was formed in the first irradiation step, the diameter φ was approximately 16.1 µm, and the depth d was approximately 17.6 µm. Therefore, the ratio d/φ was approximately 1.09.

After completing the second irradiation step, the glass substrate was observed. As a result, it was confirmed that a through hole was formed in the glass substrate. No abnormality, such as a crack or a defect, was found in the glass substrate.

Example 4

By the method that was the same as that of example 1, an attempt was made to form a through hole by irradiating the pulsed laser onto the glass substrate.

However, in example 4, the number of shots of the pulsed laser in the first irradiation step was 10 times. Other conditions were the same as those of example 1.

In the concave portion that was formed in the first irradiation step, the diameter φ was approximately 15.9 µm, and the depth d was approximately 10.7 µm. Therefore, the ratio d/φ was approximately 0.67.

After completing the second irradiation step, the glass substrate was observed. As a result, it was found that processing was not proceeded with from the concave portion that was formed in the first irradiation step, and that no through hole was formed in the glass substrate.

Example 5

By the method that was the same as that of example 1, an attempt was made to form a through hole by irradiating the pulsed laser onto the glass substrate.

However, in example 5, the number of shots of the pulsed laser in the first irradiation step was 5 times. Other conditions were the same as those of example 1.

In the concave portion that was formed in the first irradiation step, the diameter φ was approximately 14.5 μm, and the depth d was approximately 3.6 μm. Therefore, the ratio d/φ was approximately 0.24.

After completing the second irradiation step, the glass substrate was observed. As a result, it was found that processing was not proceeded with from the concave portion that was formed in the first irradiation step, and that no through hole was formed in the glass substrate.

Example 6

By the method that was the same as that of example 1, an attempt was made to form a through hole by irradiating the pulsed laser onto the glass substrate.

However, in example 6, the number of shots of the pulsed laser in the first irradiation step was 3 times. Other conditions were the same as those of example 1.

In the concave portion that was formed in the first irradiation step, the diameter φ was approximately 12.7 μm, and the depth d was approximately 2.9 μm. Therefore, the ratio d/φ was approximately 0.23.

After completing the second irradiation step, the glass substrate was observed. As a result, it was found that processing was not proceeded with from the concave portion that was formed in the first irradiation step, and that no through hole was formed in the glass substrate.

Example 7

By the method that was the same as that of example 1, a through hole was formed in a glass substrate by using the pulsed laser.

However, in example 7, the energy density $E_m$ of the pulsed laser in the first irradiation step was 1.31 J/mm², and the number of shots was 50 times. Further, the energy density $E_s$ of the pulsed laser in the second irradiation step was 1.31 J/mm², and the number of shots was 460 times.

In the concave portion that was formed in the first irradiation step, the diameter φ was approximately 20.4 μm, and the depth d was approximately 41.9 μm. Therefore, the ratio d/φ was approximately 2.05.

After completing the second irradiation step, the glass substrate was observed. As a result, it was confirmed that a through hole was formed in the glass substrate. However, it was confirmed that cracks and defects were formed in the glass substrate.

The following Table 1 collectively shows, for example 1 through example 7, the conditions of the first irradiation step and the second irradiation step; the shape of the concave portion after the first irradiation step; and the forming status of the through hole and the state of the glass substrate after the second irradiation step.

TABLE 1

| | First irradiation step | | Concave portion | | | Second irradiation step | | Through hole forming status | State |
|---|---|---|---|---|---|---|---|---|---|
| Example | Energy density (J/mm²) | Number of shots (times) | Diameter φ (μm) | Depth d (μm) | Ratio d/φ | Energy density (J/mm²) | Number of shots (times) | | |
| 1 | 1.31 | 50 | 20.4 | 41.9 | 2.05 | 0.22 | 460 | OK | Fine |
| 2 | 1.31 | 30 | 18.1 | 27.5 | 1.51 | 0.22 | 460 | OK | Fine |
| 3 | 1.31 | 20 | 16.1 | 17.6 | 1.09 | 0.22 | 460 | OK | Fine |
| 4 | 1.31 | 10 | 15.9 | 10.7 | 0.67 | 0.22 | 460 | NG | — |
| 5 | 1.31 | 5 | 14.5 | 3.6 | 0.24 | 0.22 | 460 | NG | — |
| 6 | 1.31 | 3 | 12.7 | 2.9 | 0.23 | 0.22 | 460 | NG | — |
| 7 | 1.31 | 50 | 20.4 | 41.9 | 2.05 | 1.31 | 460 | OK | Crack/defect |

Figure 7:
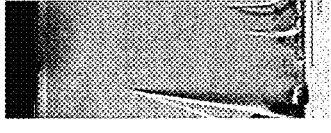
FIG. 7 is a diagram collectively illustrating cross-sectional states and surface states of a concave portion that is formed after a first irradiation step in example 1 through example 6.
Figure 7:
Figure 7:
Figure 7:
Figure 7:
Figure 7:
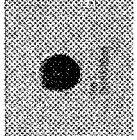
Figure 7:
Figure 7:
Figure 7:
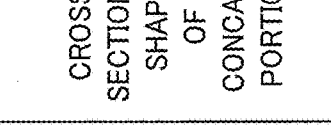
Figure 7:
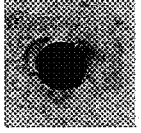
Figure 7:
Figure 7:
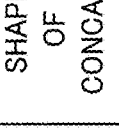

Additionally, FIG. 7 collectively shows, for example 1 through example 6, a cross-sectional state and a surface state of the concave portion formed in the glass substrate after the first irradiation step.

Example 10

By the following method, a through hole was formed in a glass substrate by using a pulsed laser.

First, a glass substrate with a thickness of 0.2 mm (alkali-free glass) was prepared. Subsequently, an absorber layer was formed on one surface of the glass substrate. The absorber layer was formed of an oil-based acrylic lacquer (H62-8808 65), and the absorber layer was formed on the glass substrate by spray coating.

Next, by the method that was the same as that of example 1, the first irradiation step and the second irradiation step of the above-described second hole forming method were implemented. The wavelength λ of the pulsed laser emitted from the laser oscillator 130 was 355 nm, and a pulse width was 20 ns. The repetition frequency was 10 kHz. Further, the diameter r of the pulsed laser beam at the time of entering the lens 140 was 2.5 mm.

Accordingly, the spot diameter S that is expressed by the above-described formula (1) is 10.8 μm, where $M^2=1.2$.

In the first irradiation step, 50 shots of the pulsed laser with energy density $E_n$ of 0.22 J/mm² were irradiated onto the glass substrate. Note that, in this example, the processing threshold value energy density $E_t$ of the glass substrate was 1.09 J/mm². Thus, $E_n<E_t$ was satisfied.

As a result, the concave portion was formed in the glass substrate.

In the concave portion, the diameter φ was approximately 12.1 μm, and the depth d was approximately 28.7 μm. Therefore, the ratio d/φ was approximately 2.37.

Subsequently, for the second irradiation step, the energy density of the pulsed laser emitted from the laser oscillator 130 was varied by the PWM control method.

In the second irradiation step, 460 shots of the pulsed laser with energy density $E_s$ of 0.55 J/mm$^2$ were irradiated onto the concave portion of the glass substrate that was formed in the first irradiation step. Here, $E_k<E_t$ was satisfied.

After completing the second irradiation step, the glass substrate was observed. As a result, it was confirmed that a through hole was formed in the glass substrate. No abnormality, such as a crack or a defect, was found in the glass substrate.

Example 11

By the method that was the same as that of example 10, a through hole was formed in a glass substrate by using the pulsed laser.

However, in example 11, the number of shots of the pulsed laser in the first irradiation step was 30 times. Other conditions were the same as those of example 10.

In the concave portion that was formed in the first irradiation step, the diameter φ was approximately 11.5 μm, and the depth d was approximately 13.0 μm. Therefore, the ratio d/φ was approximately 1.13.

After completing the second irradiation step, the glass substrate was observed. As a result, it was confirmed that a through hole was formed in the glass substrate. No abnormality, such as a crack or a defect, was found in the glass substrate.

Example 12

By the method that was the same as that of example 10, a through hole was formed in a glass substrate by using the pulsed laser.

However, in example 12, the number of shots of the pulsed laser in the first irradiation step was 20 times. Other conditions were the same as those of example 10.

In the concave portion that was formed in the first irradiation step, the diameter φ was approximately 10.9 μm, and the depth d was approximately 7.1 μm. Therefore, the ratio d/φ was approximately 0.65.

After completing the second irradiation step, the glass substrate was observed. As a result, it was confirmed that a through hole was formed in the glass substrate. However, it was confirmed that cracks and defects were generated in the glass substrate.

Example 13

By the method that was the same as that of example 10, a through hole was formed in a glass substrate by using the pulsed laser.

However, in example 13, the number of shots of the pulsed laser in the first irradiation step was 10 times. Other conditions were the same as those of example 10.

In the concave portion that was formed in the first irradiation step, the diameter φ was approximately 9.2 μm, and the depth d was approximately 3.3 μm. Therefore, the ratio d/φ was approximately 0.35.

After completing the second irradiation step, the glass substrate was observed. As a result, it was confirmed that a through hole was formed in the glass substrate. However, it was confirmed that cracks and defects were generated in the glass substrate.

Example 14

By the method that was the same as that of example 10, a through hole was formed in a glass substrate by using the pulsed laser.

However, in example 14, the number of shots of the pulsed laser in the first irradiation step was 5 times. Other conditions were the same as those of example 10.

In the concave portion that was formed in the first irradiation step, the diameter φ was approximately 6.6 μm, and the depth d was approximately 1.3 μm. Therefore, the ratio d/φ was approximately 0.19.

After completing the second irradiation step, the glass substrate was observed. As a result, it was confirmed that a through hole was formed in the glass substrate. However, it was confirmed that cracks and defects were generated in the glass substrate.

Example 15

By the method that was the same as that of example 10, a through hole was formed in a glass substrate by using the pulsed laser.

However, in example 15, the number of shots in the first irradiation step was 50 times. Further, the energy density of the pulsed laser in the second irradiation step was 1.31 J/mm$^2$, and the number of shots was 460 times. Other conditions were the same as those of example 10.

In the concave portion that was formed in the first irradiation step, the diameter φ was approximately 12.1 μm, and the depth d was approximately 28.7 μm. Therefore, the ratio d/φ was approximately 2.37.

After completing the second irradiation step, the glass substrate was observed. As a result, it was confirmed that a through hole was formed in the glass substrate. However, it was confirmed that cracks and defects were generated in the glass substrate.

The following Table 2 collectively shows, for example 10 through example 15, the conditions of the first irradiation step and the second irradiation step; the shape of the concave portion after the first irradiation step; and the forming status of the through hole and the state of the glass substrate after the second irradiation step.

TABLE 2

| Example | First irradiation step | | Concave portion | | | Second irradiation step | | Through hole forming status | State |
|---|---|---|---|---|---|---|---|---|---|
| | Energy density (J/mm$^2$) | Number of shots (times) | Diameter φ (μm) | Depth d (μm) | Ratio d/φ | Energy density (J/mm$^2$) | Number of shots (times) | | |
| 10 | 0.22 | 50 | 12.1 | 28.7 | 2.37 | 0.55 | 460 | OK | Fine |
| 11 | 0.22 | 30 | 11.5 | 13.0 | 1.13 | 0.55 | 460 | OK | Fine |
| 12 | 0.22 | 20 | 10.9 | 7.1 | 0.65 | 0.55 | 460 | OK | Crack/defect |

TABLE 2-continued

| | First irradiation step | | Concave portion | | | Second irradiation step | | Through | |
|---|---|---|---|---|---|---|---|---|---|
| Example | Energy density (J/mm²) | Number of shots (times) | Diameter φ (μm) | Depth d (μm) | Ratio d/φ | Energy density (J/mm²) | Number of shots (times) | hole forming status | State |
| 13 | 0.22 | 10 | 9.2 | 3.3 | 0.35 | 0.55 | 460 | OK | Crack/defect |
| 14 | 0.22 | 5 | 6.6 | 1.3 | 0.19 | 0.55 | 460 | OK | Crack/defect |
| 15 | 0.22 | 50 | 12.1 | 28.7 | 2.37 | 1.31 | 460 | OK | Crack/defect |

Figure 8:
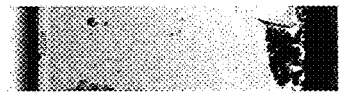
FIG. 8 is a diagram collectively illustrating the cross-sectional states and the surface states of the concave portion that is formed after the first irradiation step in example 10 through example 14.
Figure 8:
Figure 8:
Figure 8:
Figure 8:
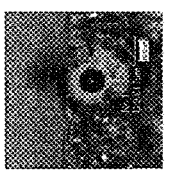
Figure 8:
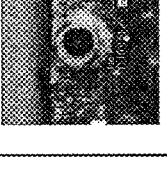
Figure 8:
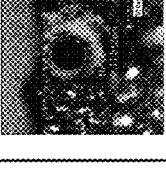
Figure 8:
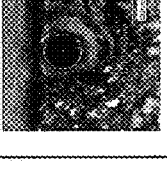
Figure 8:
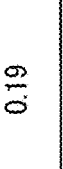

Additionally, FIG. 8 collectively shows, for example 10 through example 14, a cross-sectional state and a surface state of the concave portion formed in the glass substrate after the first irradiation step.

In this manner, it is confirmed that, by implementing the first irradiation step and the second irradiation step by the pulsed laser under a properly defined condition, a through hole can be formed in a state where an occurrence of a crack and a defect in the glass substrate is significantly suppressed.

The method of forming a hole in a glass substrate by using a pulsed laser, and the method of producing a glass substrate provided with a hole are described by the embodiments. However, the method of forming a hole in a glass substrate by using a pulsed laser, and the method of producing a glass substrate provided with a hole according to the present invention are not limited to the above-described embodiments, and various modifications and improvements may be made within the scope of the present invention.

What is claimed is:

1. A method of forming a hole in a glass substrate, comprising:
preparing a glass substrate having a first surface and a second surface that face each other;
forming a concave portion on the first surface of the glass substrate by irradiating, with a first condition, a pulsed laser onto the first surface of the glass substrate through a lens such that the concave portion on the first surface of the glass substrate has a diameter φ and a depth d, the diameter φ is greater than or equal to a diameter S (φ≥S) of a spot on the first surface of the glass substrate formed by the pulsed laser, the diameter S is expressed by a formula (i), S=(4×λ×f×M²)/(π×r), where λ is a wavelength of the pulsed laser, f is a focal length of the lens, M² is an M-squared value, and r is a diameter of a beam of the pulsed laser entering the lens, and the depth d is greater than or equal to 0.7 times the diameter φ; and
forming a hole by irradiating the pulsed laser onto the concave portion with a second condition such that energy density of the pulsed laser is less than or equal to a processing threshold value of the glass substrate,
wherein the first condition is such that the energy density of the pulsed laser is selected to exceed the processing threshold value of the glass substrate.

2. The method according to claim 1, further comprising:
forming an absorber layer on the first surface of the glass substrate.

3. The method according to claim 1, wherein a pulse train of the pulsed laser in the second condition is modulated.

4. The method according to claim 3, further comprising:
forming an absorber layer on the first surface of the glass substrate.

5. The method according to claim 3, wherein the wavelength λ of the pulsed laser is less than or equal to 1200 nm.

6. The method according to claim 3, wherein the diameter φ is in a range from 3 μm to 30 μm.

7. The method according to claim 3, wherein the depth d is in a range from 2.1 μm to 120 μm.

8. The method according to claim 3, wherein the diameter S of the spot is less than or equal to 15 μm.

9. The method according to claim 1, wherein the wavelength λ of the pulsed laser is less than or equal to 1200 nm.

10. The method according to claim 1, wherein the diameter φ is in a range from 3 μm to 30 μm.

11. The method according to claim 1, wherein the depth d is in a range from 2.1 μm to 120 μm.

12. The method according to claim 1, wherein the diameter S of the spot is less than or equal to 15 μm.

13. The method according to claim 1, wherein the wavelength λ of the pulsed laser is less than or equal to 1200 nm, the diameter φ is in a range from 3 μm to 30 μm, the depth d is in a range from 2.1 μm to 120 μm, and the diameter S of the spot is less than or equal to 15 μm.

14. A method of producing a glass substrate with a hole, comprising:
preparing the glass substrate having a first surface and a second surface that face each other;
forming a concave portion on the first surface of the glass substrate by irradiating, with a first condition, a pulsed laser onto the first surface of the glass substrate through a lens such that the concave portion on the first surface of the glass substrate has a diameter φ and a depth d, the diameter φ is greater than or equal to a diameter S (φ≥S) of a spot on the first surface formed by the pulsed laser, the diameter S is expressed by a formula (i), S=(4×λ×f×M²)/(π×r), where λ is a wavelength of the pulsed laser, f is a focal length of the lens, M² is an M-squared value, and r is a diameter of a beam of the pulsed laser entering the lens, and the depth d is greater than or equal to 0.7 times the diameter φ; and
forming a hole by irradiating the pulsed laser onto the concave portion with a second condition such that energy density of the pulsed laser is less than or equal to a processing threshold value of the glass substrate,
wherein the first condition is such that the energy density of the pulsed laser is selected to exceed the processing threshold value of the glass substrate.

15. The method according to claim 14, further comprising:
forming an absorber layer on the first surface of the glass substrate.

16. The method according to claim 14, wherein a pulse train of the pulsed laser in the second condition is modulated.

17. The method according to claim 14, wherein the wavelength $\lambda$ of the pulsed laser is less than or equal to 1200 nm.

18. The method according to claim 14, wherein the diameter $\phi$ is in a range from 3 μm to 30 μm.

19. The method according to claim 14, wherein the depth d is in a range from 2.1 μm to 120 μm.

20. The method according to claim 14, wherein the diameter S of the spot is less than or equal to 15 μm.

* * * * *